United States Patent
Joho

(10) Patent No.: US 6,711,805 B2
(45) Date of Patent: Mar. 30, 2004

(54) PROCESS FOR THE PRODUCTION OF A ROTOR, CONTAINING PERMANENT MAGNETS, OF A SYNCHRONOUS MACHINE, AND ROTOR PRODUCED ACCORDING TO THIS PROCESS

(75) Inventor: Reinhard Joho, Rombach (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 09/996,694

(22) Filed: Nov. 30, 2001

(65) Prior Publication Data

US 2003/0011262 A1 Jan. 16, 2003

(30) Foreign Application Priority Data

Dec. 4, 2000 (DE) .......................... 100 60 121

(51) Int. Cl.⁷ .............................. H02K 15/00
(52) U.S. Cl. ................. 29/596; 29/598; 310/156.23; 310/261
(58) Field of Search ............... 29/596, 598, 606–609; 310/156.23, 156.21, 162, 43, 261

(56) References Cited

U.S. PATENT DOCUMENTS 4,182,027 A * 1/1980 Benezech ................. 29/598
5,191,256 A * 3/1993 Reiter, Jr. et al. .......... 310/156
6,437,473 B1 * 8/2002 Mobius et al.

FOREIGN PATENT DOCUMENTS

| DE | 939 584 | 2/1956 |
|---|---|---|
| DE | 28 13 300 C2 | 10/1978 |
| DE | 30 21 607 C2 | 12/1981 |
| DE | 38 44 074 C2 | 7/1990 |
| DE | 39 38 007 C2 | 8/1990 |
| DE | 295 04 640 C2 | 6/1995 |
| DE | 199 03 251 A1 | 8/2000 |

* cited by examiner

*Primary Examiner*—Thanh Lam
(74) *Attorney, Agent, or Firm*—Burns, Doane, Swecker & Mathis, L.L.P.

(57) ABSTRACT

The rotor has a core with an internal space. Permanent magnets are arranged on the core. These permanent magnets are surrounded by an outer cylinder, which is connected flush to closure disks which bear stub shafts. Channels run out from the internal space in the radial direction to the region of the permanent magnets. A resin mass is first introduced into the internal space. The rotor is thereafter heated and run up to centrifuging rotational speed. As a result, the molten resin mass flows through the channels to the region of the permanent magnets and fills up all the cavities present there and also cracks which form in the brittle permanent magnets on running up to speed. The resin mass hardens while the rotor is kept at centrifuging rotational speed. Each surface region of the permanent magnets is thus reliably protected against corrosion.

20 Claims, 3 Drawing Sheets

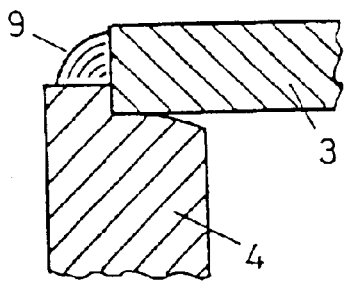
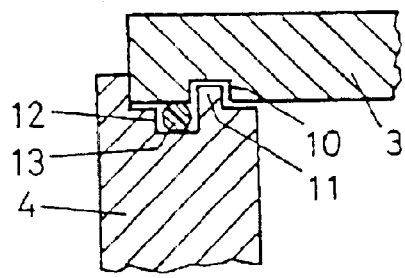
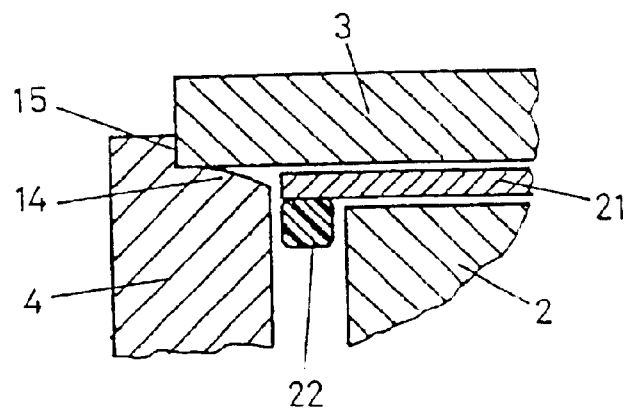
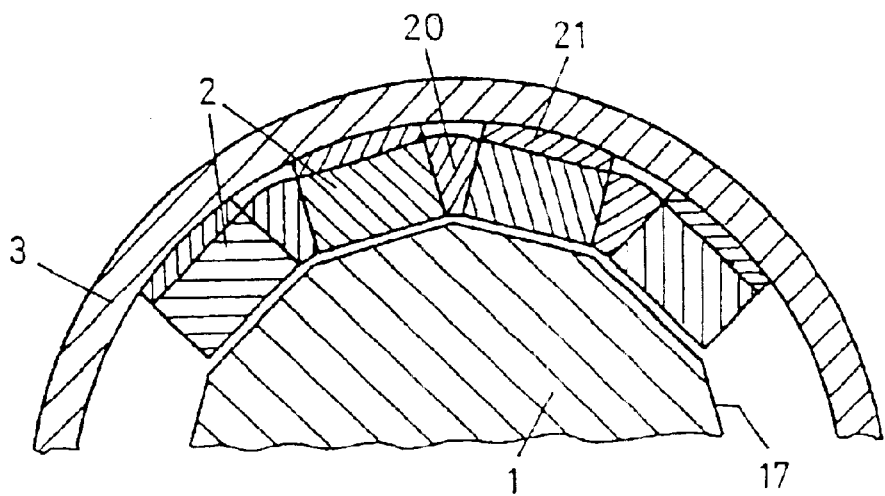

PROCESS FOR THE PRODUCTION OF A ROTOR, CONTAINING PERMANENT MAGNETS, OF A SYNCHRONOUS MACHINE, AND ROTOR PRODUCED ACCORDING TO THIS PROCESS

FIELD OF THE INVENTION

The present invention relates to the production of a rotor, containing permanent magnets, of a synchronous machine, which rotor has a core of ferromagnetic steel, on which and connected to the core of which are permanent magnets which in turn are surrounded by an outer cylinder of a non-magnetizable steel, and which rotor has closure plates of a non-magnetizable steel with a stub shaft.

BACKGROUND OF THE INVENTION

In the operation of a permanent magnet excited synchronous machine, the permanent magnets seated on the rotor are exposed to considerable centrifugal forces, with the consequence that they tend to come loose from the rotor. Shrinking on a metallic cylinder over the magnets seated on the rotor is known. The permanent magnets, as is well known, consist of a brittle material, so that cracks and breaks are already practically unavoidable when shrinking the cylinder on. These permanent magnets moreover consist of a material which is very susceptible to corrosion and have to be wholly surrounded by a protective layer which is also durable during operation. The application of such protective layers on the one hand requires much work and on the other hand, in known constitutions, leaves broken places on the permanent magnets, occurring on (a first) run-up to operating rotational speed, without any protection against corrosion. It is known that the permanent magnets have to be ground to obtain correct dimensions, This grinding also requires much work.

SUMMARY OF THE INVENTION

The invention has as its object to provide a process of production of a permanent magnet excited synchronous machine, and a rotor produced by this process, according to which the permanent magnets are mounted hydrostatically, so to speak, and furthermore the permanent magnets also have no unprotected surfaces even after sustaining fractures after first running up to operating speed.

The process according to the invention is distinguished in that the core is constituted with an internal space, and a resin mass is introduced into the internal space and is supplied to the region of the permanent magnets by centrifuging the rotor, a hardening of the resin mass then taking part in the said region. The rotor produced by the process according to the invention is characterized by a core of ferromagnetic steel and an internal space extending axially, the permanent magnets being arranged on the said core and being surrounded by an outer cylinder of non-magnetizable material, the said rotor having closure disks of non-magnetizable steel at both ends with stub shafts, which are positively connected to the core and at least frictionally connected to the outer cylinder, and that all the cavities in the region of the permanent magnets are filled with a resin mass.

The advantages attained with the invention are in particular that the permanent magnets are completely surrounded by the resin mass and thus in actual fact are hydrostatically mounted, so that they are secured against a displacement due to centrifugal forces; and that the resin mass is still flowable during the first running-up to speed, so that it fills the cracked regions of the permanent magnets appearing during this period, and covers the additionally resulting bare surfaces of the permanent magnets.

BRIEF DESCRIPTION OF THE DRAWING

Preferred embodiments of the invention are discussed in the following description and illustrated in the accompanying drawings, in which:

FIG. 3 shows a first embodiment of the connection between the outer cylinder and a closure disk of the rotor.

FIG. 4 shows a second embodiment of the connection between the outer cylinder and a closure disk of the rotor.

FIG. 5 shows a third embodiment of the connection between the outer cylinder and a closure disk of the rotor.

FIG. 6 shows, on an enlarged scale, a cross section through a portion of the rotor, in order to illustrate the filler strips.

DETAILED DESCRIPTION OF THE INVENTION

Figure 1:
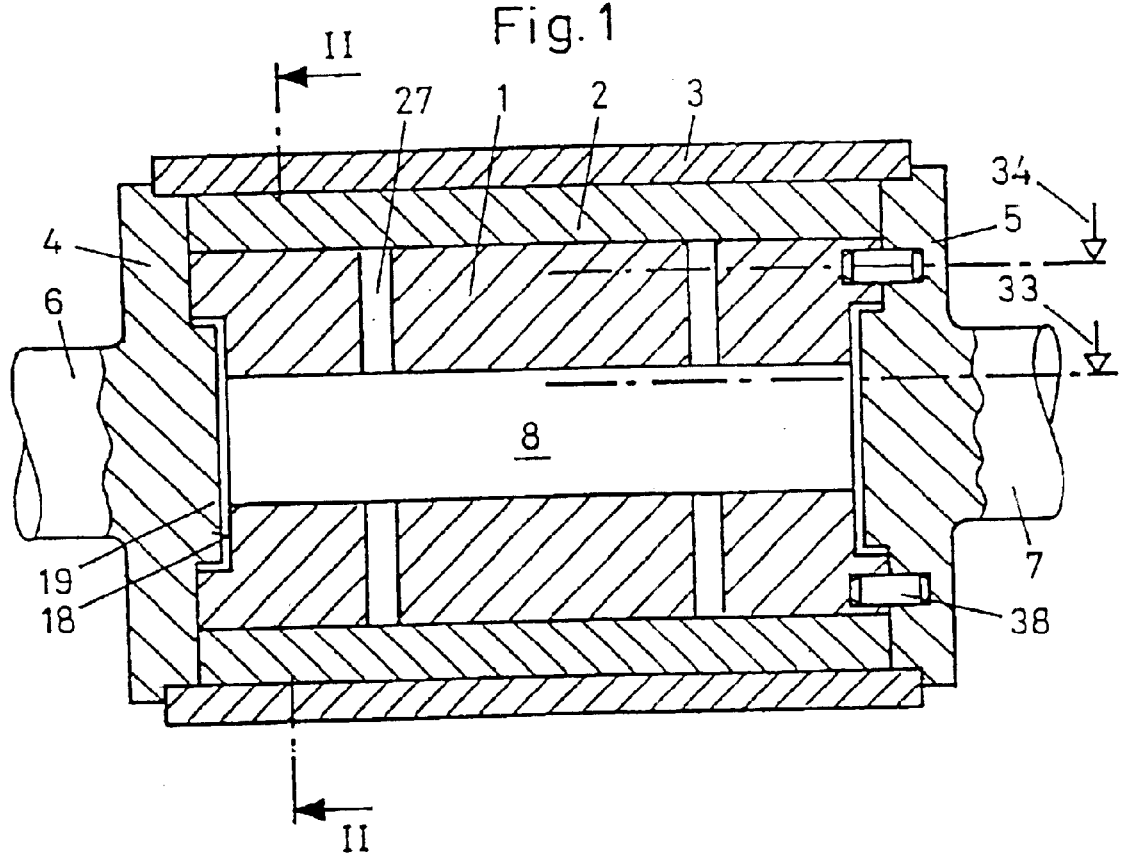
FIG. 1 shows a longitudinal section through a first embodiment of the rotor according to the invention.

The rotor of the first embodiment, shown in FIG. 1, has an integrally constituted core 1 of a ferromagnetic material. Permanent magnets 2 are arranged on the core 1. The permanent magnets are shown as one piece for the sake of clarity, but they can however also be arbitrarily divided. The permanent magnets 2 are surrounded by an outer cylinder 3 of a metallic, non-magnetizable material. The outer cylinder 3 can consist, for example, of high strength, cold-rolled, austenitic steel, or of a high strength bronze which conducts electricity well, e.g., $CuNi_3Si$, to achieve the smallest electrical surface losses. The rotor ends on both sides with a closure disk 4 or 5 with a stub shaft 6 or 7 which consists of non-magnetizable steel.

The core 1 has an internal space 8 constituted as an axial through bore, which serves as a storage space as will be described. Channels 27 run in a radial direction from the internal space 8 to the region of the permanent magnets 2.

The core 1 furthermore has a polygonal recess 18 at both axial ends. The closure disks 4 or 5 have a correspondingly shaped projection 19. The core 1 is centered on the closure disks 4 or 5 by means of these projections 19 and recesses 18, the polygonal shape moreover serving for excellent transmission of the torque of the core 1 to the closure disks 4 or 5 and thus to the stub shafts 6 or 7. Instead of a central projection 19, there can be an arrangement of shear bolts 38 which connect the core 1 to the closure disks 4 or 5.

Figure 2:
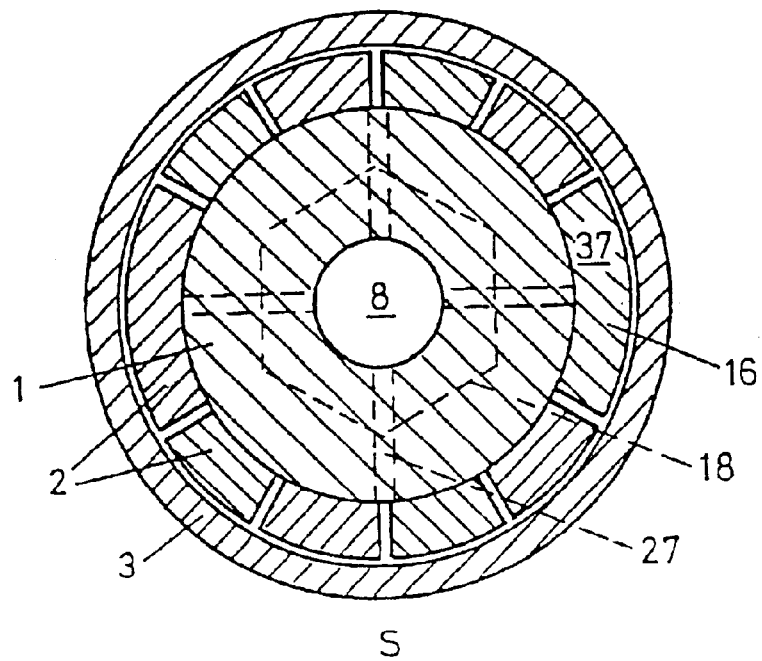
FIG. 2 shows a section along the line II—II of FIG. 1.

FIG. 2 shows a section through the rotor along the line II—II of FIG. 1. It can be seen that the permanent magnets 2 seated on the core 1 are encircled by the outer cylinder 3, and the core 1 has the internal space 8. In a known manner, the rotor forms a north pole N and a south pole S in the 2-pole embodiment shown here by way of example. Lateral, magnetically neutral zones 37 are present, as is generally known. Filler pieces 16 of a magnetizable or non-magnetizable material, according to the desired magnetic salience, are inserted at these neutral zones 37, in the corresponding annular space portions between the outer cylinder 3 and the core 1. The density of the material of these filler pieces 16 is advantageously at least approximately equal to the density of the material of the permanent magnets 2, that is, the density of the filler pieces 16 is advantageously similar to the density of the permanent magnets 2.

For the assembly of the rotor, the outer cylinder 3, according to a variant, is shrunk onto the closure disks 4 or 5.

The final connection between the outer cylinder 3 and the closure disks 4 or 5 takes place according to a first embodiment, which is shown in FIG. 3, by means of a tight peripheral weld seam 9. As will be described hereinafter, the production of this tight peripheral weld seam 9 takes place in two steps.

A further embodiment of the connection between the shrunk-on outer cylinder 3 and the closure disks is shown in FIG. 4.

The outer cylinder 3 of this embodiment has at both ends an inner circumferential groove 10. The respective closure disk 4 or 5 has a corresponding outer circumferential projection 11. Near this outer circumferential projection 11 is an outer circumferential groove 12 with an O-ring 13 inserted into it. If the outer cylinder 3 is shrunk onto the respective closure disk 4 or 5, the respective outer circumferential projection 11 projects into the respective inner circumferential groove 10. Furthermore, the respective O-ring 13 directly abuts the outer cylinder 3.

FIG. 5 shows a further variant of the connection between the outer cylinder 3 and the closure disk 4 or 5, in which no shrinking-on takes place. The respective closure disk 4 or 5 has for this purpose a cone-shaped portion 14 facing toward the rotor interior. This cone-shaped portion 14 ends in a shoulder portion 15 formed as a stop. In this embodiment, the closure disks 4, 5 are hydraulically pressed in over the cone-shaped portion 14 until they come to abut on the shoulder portion 15 in the outer cylinder 3.

Reference is made to FIG. 6 in addition to FIG. 5. The core 1 shown in FIG. 6 has a polygonal circumferential surface. The dimensions of the flat-surfaced surface portions 17 of the outer circumference of the core 1 correspond to the dimensions of the permanent magnets 2 arranged on it. Thus the circumferential surface of the core 1 conforms to the contour of the permanent magnets 2, so that no large magnetic gap is present. Furthermore, excellent transmission of torque from the permanent magnets 2 to the core 1 results from this polygonal shaping of the circumferential surface of the core.

Filler strips 20 of a dimensionally stable, preferably metallic, material are arranged between the individual permanent magnets 2. These filler strips can be provided with a thin nonwoven covering for fitting purposes, at least opposite the permanent magnets. Further filler strips 21 are arranged between the permanent magnets 2 and the opposing inner circumferential regions of the outer cylinder 3. These further filler strips 21 consist of material which conducts well, e.g., Cu or Al.

Excellent fitting to the rectangular cross sectional shape of the permanent magnets 2 is made possible by the filler strips 20, 21. If absolutely necessary, only the faces of the permanent magnets 2 facing the outer cylinder 3 are ground; for the rest, all the surfaces can remain unworked.

The further filler strips 21 are connected at their ends to a flexibly constituted ring 22 which conducts electricity well; see also FIG. 5. This ring 22 can consist of a braided wire or can be of laminated construction. The connection of the further filler strips 21 to the flexible ring 22 can take place by welding, e.g., spot welding.

These further filler strips 21 together with the ring 22 thus form a damping cage. During assembly of the rotor, these weld connections are produced before the positioning and securing of the closure disks 4, 5 on the outer cylinder 3.

Figure 7:
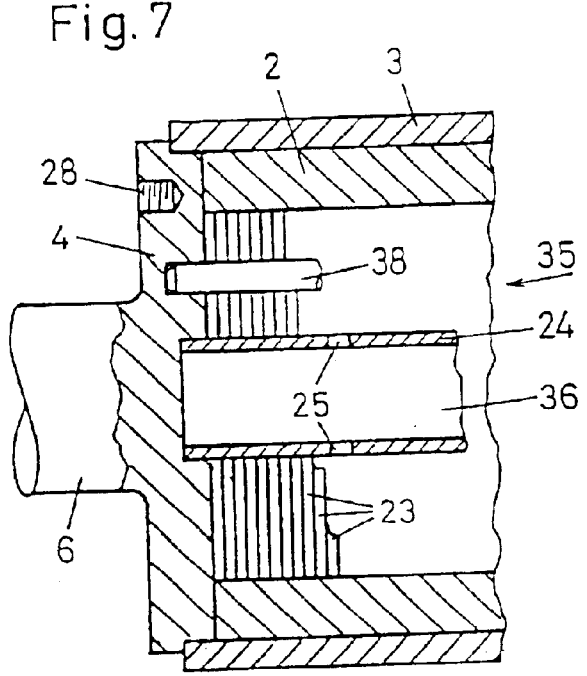
FIG. 7 shows a longitudinal section, similar to that of FIG. 1, through a portion of a second embodiment of the rotor according to the invention.
Figure 8:
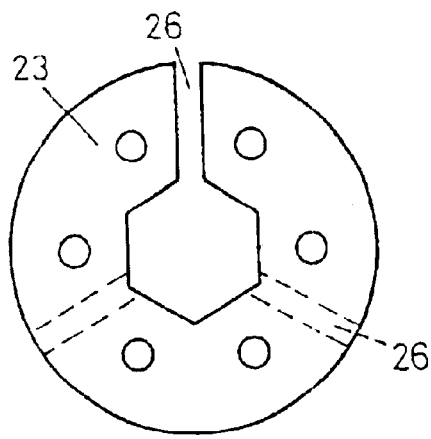
FIG. 8 shows a diagram of a slotted sheet of a sheet metal packet shown in FIG. 7.

In the embodiment shown in FIG. 7, the core, generally denoted by the reference numeral 35, is embodied of stacked metal sheets 23. These metal sheets 23 are arranged as a metal sheet packet on a centering tube 24. The centering tube 24 has holes 25 running in a radial direction. The metal sheets 23 arranged in the neighborhood of these holes 25 have a longitudinal slot 26 and are stacked in a cyclically rotated arrangement (see FIG. 8), so that passages from an internal space 36 of the centering tube 24 to the region of the permanent magnets 2 are present, analogous to the channels 27 of the first embodiment.

Instead of the centering tube 24, the metal sheets 23 can be perforated in order to be able to receive shear bolts 38. These shear bolts 38 can project in over the length of the metal sheet packet and into the closure disks 4, 5, in order to transmit torque.

The embodiment with a core 35 of a metal sheet packet is a precondition for an oscillating magnetization. However, this embodiment has no damping cage according to that of the embodiment shown in FIGS. 5 and 6.

The reference numeral 28 in FIG. 7 denotes, in each closure disk, periodically annularly positioned threaded holes to receive balancing screws (not shown) for balancing the rotor. Alternatively, bores with desired diameter and depth can be bored during balancing.

Figure 9:
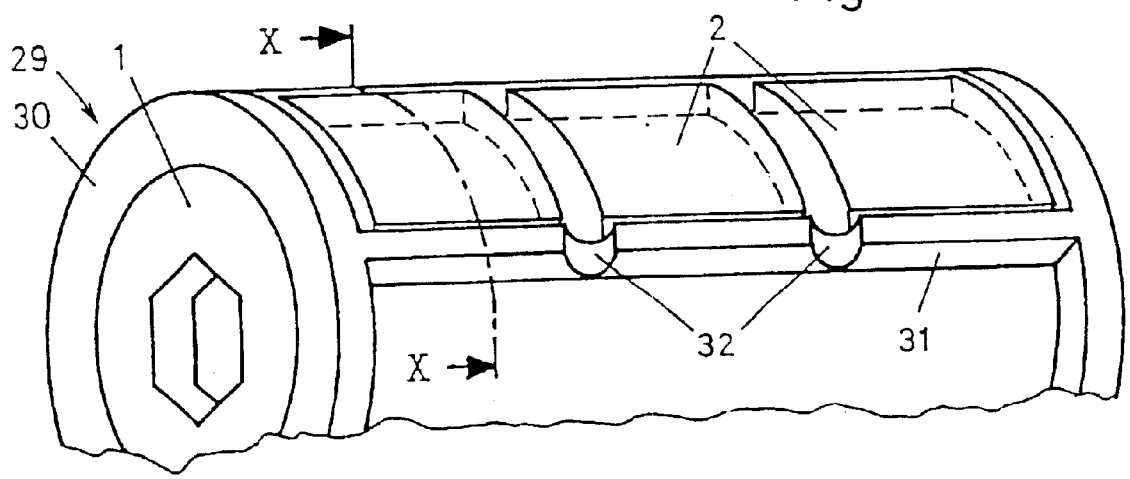
FIG. 9 shows a schematic view of a portion of a rotor with a cage.
Figure 10:
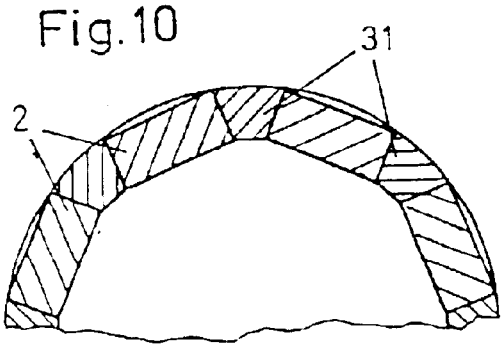
FIG. 10 shows a section along the line X—X of FIG. 9.

A yet further embodiment is shown in FIGS. 9 and 10. A cage 29 with end rings 30 and longitudinal rods 31 is produced from a material (e.g., Cu, Al) which conducts well, and acts as an electrical damping cage in the finished rotor. To assemble the rotor, this cage 29 is pushed into the outer cylinder 3. The individual permanent magnets 2 are inserted into the cage 29, which serves as a filling matrix, and are adhered to the outer cylinder with a provisional adhesive. Thereupon the core 1 is pushed into the cage 29, and the closure disks 4, 5 are then mounted.

Alternatively, the cage 29 with the permanent magnets 2 can first be arranged on the core 1 and then the outer cylinder 3 can be pushed over them.

The purpose of the transverse grooves 32 in the longitudinal rods 31 will be explained hereinafter.

To complete the rotor according to the invention, a resin mass is introduced into the internal space 8, serving as a storage space, of the core 1, or in the embodiment according to FIG. 7, into the internal space 36 of the centering tube 24. Such resin masses are generally known and thus do not have to be described further. These resin masses can furthermore contain fillers, e.g., an aluminum oxide powder. Advantageously, the resin mass is introduced in the form of a solid rod, as a so-called B-stage adhesive.

The rotor is then run up to speed and simultaneously heated, according to a predetermined time program. The program can include steady state points at intermediate rotational speeds and intermediate temperatures. The resin mass, now molten, thus penetrates through the channels 27 in the core 1 or, in the embodiment of FIG. 7, through the holes 25 in the centering tube 24 and through the longitudinal slots 26 in the relevant metal sheets 23, in a radially outward direction toward the permanent magnets 2. The transverse grooves 32 described in FIG. 9 serve to equalize the flow of the resin mass.

The resin mass flowing outward due to the centrifugal force fills all the cavities present, and the permanent magnets 2 are completely surrounded by the resin mass. Since it is known that cracks and fractures unavoidably occur in the brittle permanent magnets when the rotor is first run up to speed, these regions also are reliably filled by the flowable resin mass.

The hardening of the resin mass takes place at the centrifuging speed of the rotor. This speed is higher than the maximum rotational speed and is only applied during manufacture of the rotor.

The region of the inner level of the resin mass after centrifuging is shown in FIG. 1 by the arrows 33 and 34 and also by the dashed lines. The resin mass to be filed into the internal space is thereby determined.

Due to the hardening of the resin mass during centrifuging, the outer cylinder 3 remains prestressed at the later rotational speeds and when stationary.

It is to be mentioned that the peripheral weld seam 9 described in connection with FIG. 3 is pre-welded only in a single pass before the described course of hardening. The circumferential weld seam 9 is completely after-welded only after the course of hardening. The outer cylinder 3 is seated on cooled clamp jaws (not shown) during the welding process. The balancing of the rotor takes place at the threaded holes 28, described in FIG. 7, after the course of hardening. The internal space 8 in the core 1, or the internal space 36 of the centering tube 25, can furthermore serve as a so-called heat pipe and be cooled via the stub shafts 6, 7 or by means of flanged-on heat exchangers. It is within the scope of the present invention that the rotor has a stub shaft at only one side, and the other end remains free. The closure disk at the free end remains for sealing purposes.

It is thus apparent that the permanent magnets are mounted hydrostatically, so to speak, and in particular that cracks occurring when the rotor is first run up to speed are filled with the molten resin mass, so that the permanent magnets are completely locked in from the ambient atmosphere and thus are extremely corrosion-resistant.

The permanent magnets can be provided with insulating coatings in order to prevent current paths to adjacent electrically conducting components.

As an alternative mode of manufacture, prestressed flat binding strips can be placed around the permanent magnets and possible damper rods 21 before the installation of the outer cylinder 3. The permanent magnets can then be magnetized in an oscillating manner. The rings 22 are thereafter applied, without however removing the strips. Alternatively, the filler strips 20 can likewise consist of material which conducts electricity well, and can be connected to the rings 22.

What is claimed is:

1. Process for the production of a rotor of a synchronous machine, containing permanent magnets, the rotor having a core of ferromagnetic steel, on and connected to which core are permanent magnets which in their turn are surrounded by an outer cylinder of a non-magnetizable material, and which rotor has at both axial ends a closure disk of a non-magnetizable steel with a stub shaft, wherein the core is constituted with an internal space, the process comprising:

introducing a resin mass into the internal space;

supplying said resin mass to a region of the permanent magnets by centrifuging the rotor; and hardening of the resin mass in the region of the permanent magnets.

2. Process according to claim 1, further comprising:

heating and simultaneously running up to a centrifuging speed the rotor with the introduced resin mass, such that the resin mass is conducted outward, due to centrifugal force, from the internal space through radial channels in the core, or from the internal space through holes and longitudinal slots in the core, to the region of the permanent magnets, and the cavities present there are filled up; and maintaining the rotor at the centrifuging speed during the hardening of the resin mass.

3. Process according to claim 1, further comprising:

arranging the permanent magnets on the core by inserting the permanent magnets with play into the outer cylinder;

arranging at each end after the introduction of the resin mass into the internal space the respective closure disk, each closure disk consisting of non-magnetizable steel with a stub shaft and the core centered in the closure disks; and connecting the outer cylinder to the closure disks.

4. Process according to claim 1, wherein the resin mass is introduced into the internal space in the core in the form of a solid rod.

5. Process according to claim 1, wherein the resin mass contains at least one filler.

6. Process according to claim 1, wherein the outer cylinder is shrunk onto the closure disks.

7. Process according to claim 6, wherein the shrunk-on outer cylinder is connected flush to the closure disks by means of a circumferential weld seam.

8. Process according to claim 7, wherein the circumferential weld seam is pre-welded in only one pass before the centrifuging of the resin and is only completely after-welded after the hardening of the resin.

9. Process according to claim 6, wherein the outer cylinder is constituted at both ends with an inner circumferential groove and the closure disks are constituted with an outer circumferential projection and an adjacently arranged outer circumferential groove with an inserted O-ring, and the outer cylinder is shrunk onto the closure disks such that the respective outer circumferential projection of the closure disks projects into the respective inner circumferential groove, and the respective O-ring abuts the outer cylinder flush.

10. Process according to claim 1, wherein the closure disks are constituted with a cone-shaped portion directed toward the rotor interior, and are pressed into the outer cylinder, to connect with it, as far as a stop.

11. Process according to claim 1, wherein magnetic neutral zones are present in annular space portions between the core and the outer cylinder, which neutral zones contain no permanent magnets, and the process further comprises inserting filler pieces into said annular space portions, the density of the material of the filler pieces being at least approximately equal to the density of the material of the permanent magnets.

12. Process according to claim 1, further comprising inserting a filter strip between adjacent permanent magnets.

13. Process according to claim 1, further comprising inserting a further filler strip between the permanent magnets and the inner circumferential regions of the outer cylinder lying opposite said permanent magnets.

14. Process according to claim 13, further comprising:
forming a damping cage by connecting the further filler strips at their ends to a respective flexibly constituted ring;
arranging said further filler strips around the core; and
installing the closure disks.

15. Process according to claim 14, wherein the further filler strips are connected by spot welding.

16. Process according to claim 1, further comprising:
producing a cage of an electrically conductive material with end rings and axially-running longitudinal rods with transverse grooves for distributing the resin;
inserting the permanent magnets into the cage; and
pushing the cage with the permanent magnets into the outer cylinder followed by adhering the permanent magnets to the outer cylinder with a provisional adhesive and thereafter pushing the core into the cage, or pushing the core into the cage and thereafter pushing the outer cylinder over the age with the permanent magnets.

17. Process according to claim 1, further comprising stacking metal sheets on a centering tube to produce the core, the centering tube having holes for the passage of resin mass arranged in the internal space and the metal sheets having slots aligned with the holes for the further passage of the resin.

18. Process according claim 1, wherein the core is integral and is constituted with an internal space, which internal space serves as a storage space for the resin mass, and from which internal space channels are constituted running in a radial direction toward the outside of the core.

19. Process according to claim 1, wherein the core is constituted at both axial ends with a polygonal recess, each closure disk being constituted with a polygonal projection corresponding to the recesses of the core, and the process further comprises inserting the projections into the recesses during assembly of the rotor in order to form a positive connection for force transmission between the core and the closure disks.

20. Process according to claim 1, wherein the core has an outer circumferential surface constituted of polygonal shape with many planar surface portions, the dimensions of each individual surface portion being conformed to the dimensions of the permanent magnets so that a magnetic gap formed between the core and the permanent magnets arranged on the surface portions is minimized, and a predetermined transmission of torque from the permanent magnets to the core is attained.

* * * * *